(12) United States Patent
Littlefield et al.

(10) Patent No.: US 10,138,947 B2
(45) Date of Patent: Nov. 27, 2018

(54) RADIALLY APPLIED DOG CLUTCH WITH BI-DIRECTIONAL RATCHETING FOR A VEHICLE TRANSMISSION

(71) Applicant: GM GLOBAL TECHNOLOGY OPERATIONS LLC, Detroit, MI (US)

(72) Inventors: Joseph R Littlefield, Sterling Heights, MI (US); Jonathan Boyd, Royal Oak, MI (US)

( * ) Notice: Subject to any disclaimer, the term of this patent is extended or adjusted under 35 U.S.C. 154(b) by 169 days.

(21) Appl. No.: 15/434,526

(22) Filed: Feb. 16, 2017

(65) Prior Publication Data

US 2018/0231064 A1 Aug. 16, 2018

(51) Int. Cl.
*F16D 11/16* (2006.01)
*F16D 23/12* (2006.01)

(52) U.S. Cl.
CPC .............. *F16D 11/16* (2013.01); *F16D 23/12* (2013.01); *F16D 2023/123* (2013.01)

(58) Field of Classification Search
None
See application file for complete search history.

(56) References Cited

U.S. PATENT DOCUMENTS

| 4,417,650 | A | * | 11/1983 | Geisthoff | F16D 43/2028 192/56.1 |
| 4,429,768 | A | * | 2/1984 | Margetts | F16D 55/224 188/196 D |
| 5,090,532 | A | * | 2/1992 | Bich | F16D 7/048 192/56.1 |
| 5,342,241 | A | * | 8/1994 | Kampf | F16D 43/2028 464/37 |
| 6,666,283 | B2 | * | 12/2003 | Frauhammer | B25B 23/141 173/93 |
| 8,672,110 | B2 | * | 3/2014 | Jaeger | F16D 7/048 192/56.1 |
| 9,151,339 | B2 | * | 10/2015 | Lee | F16D 21/00 |
| 10,036,429 | B2 | * | 7/2018 | Ince | F16D 13/10 |
| 2005/0167230 | A1 | * | 8/2005 | Gumpoldsberger | F16D 11/10 192/69.7 |
| 2012/0234131 | A1 | * | 9/2012 | Robinette | F16D 43/18 74/572.2 |
| 2013/0281242 | A1 | | 10/2013 | Tolkacz et al. | |

* cited by examiner

*Primary Examiner* — Jacob S. Scott
*Assistant Examiner* — Timothy Hannon

(57) ABSTRACT

A dog clutch for a vehicle transmission includes a driving member configured to rotate about an axis and including a cavity extending radially from the axis, a driving tooth slidably movable within the radially extending cavity, a driven member coaxially surrounding the driving member and including a radially inward extending driven tooth axially aligned with the driving tooth, an actuator shaft coaxially positioned within the driving member and movable along the axis, a retainer on the actuator shaft, a bullet actuator coaxially mounted on the actuator shaft, and a biasing member coaxially mounted on the actuator shaft and positioned between the bullet actuator and the retainer.

20 Claims, 6 Drawing Sheets

RADIALLY APPLIED DOG CLUTCH WITH BI-DIRECTIONAL RATCHETING FOR A VEHICLE TRANSMISSION

FIELD

The present disclosure relates to a radially applied dog clutch with bi-directional ratcheting for a vehicle transmission.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Clutches are commonly found in automotive transmissions. Friction clutches are most common, but suffer from a number of disadvantages. Friction clutches suffer from spin losses and pump losses. Friction clutches typically require a high pressure hydraulic system to control operation of the clutch. The energy consumed by the pump(s) that provide the source for high pressure hydraulic fluid can adversely affect the efficiency of a vehicle incorporating a transmission that includes friction clutches and, thus, reduce its fuel economy.

In contrast, a dog clutch provides a selectively actuatable solid connection that does not rely upon friction. Rather, a dog clutch relies upon interference between components of the clutch. Dog clutches also do not suffer from slip. Further, a dog clutch does not require a high pressure hydraulic system to actuate. Thus, dog clutches may provide multiple advantages over a friction clutch.

Another disadvantage with a dog clutch is that they may be difficult to disconnect or disengage, especially while under load. The centrifugal force acting on the teeth resist any radially inward motion of the teeth, thereby, making disengagement sometimes unreliable.

Additionally, even when disengaged, the centrifugal force exerted on the teeth in a radially applied dog clutch cause them to move radially outward. This results in undesirable contact between these teeth and the outer driven teeth which may be a significant source of noise (ratcheting noise) and a cause for spin losses which adversely affects the overall efficiency of the system and resulting loss in fuel economy.

SUMMARY

In an exemplary aspect, a dog clutch for a vehicle transmission includes a driving member configured to rotate about an axis and including a cavity extending radially from the axis, a driving tooth slidably movable within the radially extending cavity, a driven member coaxially surrounding the driving member and including a radially inward extending driven tooth axially aligned with the driving tooth, an actuator shaft coaxially positioned within the driving member and movable along the axis, a retainer on the actuator shaft, a bullet actuator coaxially mounted on the actuator shaft, and a biasing member coaxially mounted on the actuator shaft and positioned between the bullet actuator and the retainer.

In another exemplary aspect, the actuator shaft includes a swaged end.

In another exemplary aspect, the bullet actuator is positioned between the swaged end and the biasing member.

In another exemplary aspect, the bullet actuator includes an engagement landing and a disengagement landing axially adjacent to the engagement landing.

In another exemplary aspect, the engagement landing is radially inwardly sloping toward the disengagement landing.

In another exemplary aspect, the engagement landing is radially inwardly sloping away from the biasing member.

In another exemplary aspect, the biasing member axially biases the bullet actuator on the actuator shaft in an axial direction toward an engagement axial position providing contact between the driving tooth and the engagement landing such that the driving tooth engages the driven tooth and away from a disengagement axial position providing contact between the driving tooth and the disengagement landing such that the driving tooth does not engage the driven tooth.

In another exemplary aspect, the bullet actuator further includes a ramp surface between the engagement landing and the disengagement landing.

In another exemplary aspect, the biasing member includes a helical coil spring coaxially surrounding the actuator shaft.

In another exemplary aspect, the actuator shaft includes a retaining groove and wherein the retainer is positioned within the retaining groove.

In another exemplary aspect, a dog clutch for a vehicle transmission includes a driving member configured to rotate about an axis and including a first cavity extending radially from the axis and a second cavity extending radially from the axis, a first driving tooth slidably movable within the first radially extending cavity, a second driving tooth slidably movable within the second radially extending cavity, a first driven member coaxially surrounding the driving member and including a first radially inward extending driven tooth axially aligned with the first driving tooth, a second driven member coaxially surrounding the driving member and including a second radially inward extending driven tooth axially aligned with the second driving tooth, an actuator shaft coaxially positioned within the driving member and including a swaged end and movable along the axis, a retainer on the actuator shaft, a bullet actuator coaxially mounted on the actuator shaft and including a radially inward extending projection, a first biasing member coaxially mounted on the actuator shaft and axially positioned between the radially inward extending projection and the retainer, and a second biasing member coaxially mounted on the actuator shaft and axially positioned between the radially inward extending projection and the swaged end.

In another exemplary aspect, the bullet actuator further includes a first disengagement landing, a second disengagement landing and an engagement landing axially positioned between the first disengagement landing and the second disengagement landing.

In another exemplary aspect, the engagement landing radially slopes inwardly to the first disengagement landing and the second disengagement landing.

In another exemplary aspect, bullet actuator further includes a first ramp surface between the first disengagement landing and the engagement landing and a second ramp surface between the second disengagement landing and the engagement landing.

In another exemplary aspect, one of the first biasing member and the second biasing member includes a helical coil spring coaxially surrounding the actuator shaft.

In another exemplary aspect, a dog clutch for a vehicle transmission includes a driving member configured to rotate about an axis and including a first cavity extending radially from the axis and a second cavity extending radially from the axis, a first driving tooth slidably movable within the first radially extending cavity, a second driving tooth slidably movable within the second radially extending cavity, a first driven member coaxially surrounding the driving member and including a first radially inward extending driven tooth that is axially aligned with the first driving tooth, a second driven member coaxially surrounding the driving member and including a second radially inward extending driven tooth that is axially aligned with the second driving tooth, an actuator shaft coaxially positioned within the driving member and including a swaged end and movable along the axis, a first bullet actuator coaxially mounted on the actuator shaft and positioned adjacent to the swaged end, a first biasing member coaxially mounted on the actuator shaft and axially positioned adjacent to the first bullet actuator, a first retainer on the actuator shaft axially positioned adjacent to the first biasing member, a second biasing member coaxially mounted on the actuator shaft and axially positioned adjacent to the first retainer, a second bullet actuator coaxially mounted on the actuator shaft and axially positioned adjacent to the second biasing member, a third biasing member coaxially mounted on the actuator shaft and axially positioned adjacent to the second bullet actuator, and a second retainer on the actuator shaft and axially positioned adjacent to the third biasing member.

In another exemplary aspect, one of the first bullet actuator and the second bullet actuator includes a first engagement landing, a second engagement landing and a disengagement landing axially positioned between the first disengagement landing and the second disengagement landing.

In another exemplary aspect, one of the first engagement landing and the second engagement landing radially slopes inwardly to the disengagement landing.

In another exemplary aspect, the one of the first bullet actuator and the second bullet actuator further includes a first ramp surface between the first engagement landing and the disengagement landing and a second ramp surface between the second engagement landing and the disengagement landing.

In another exemplary aspect, one of the first biasing member, second biasing member, and third biasing member includes a helical coil spring coaxially surrounding the actuator shaft.

In this manner, the present invention provides all of the advantages of a dog clutch over a friction clutch (obviating friction losses and pumping losses) while enabling an easier, more consistent, more controllable, and reliable disengagement and minimizing or preventing ratcheting noises and spin losses, thereby significantly improving efficiency, fuel economy and reducing noise.

Further, exemplary embodiments of the present invention provide the ability to minimize or prevent potential damage in an overload condition and also to control multiple radially applied dog clutches using a single actuator which can greatly simplify operation, reduce size and cost.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
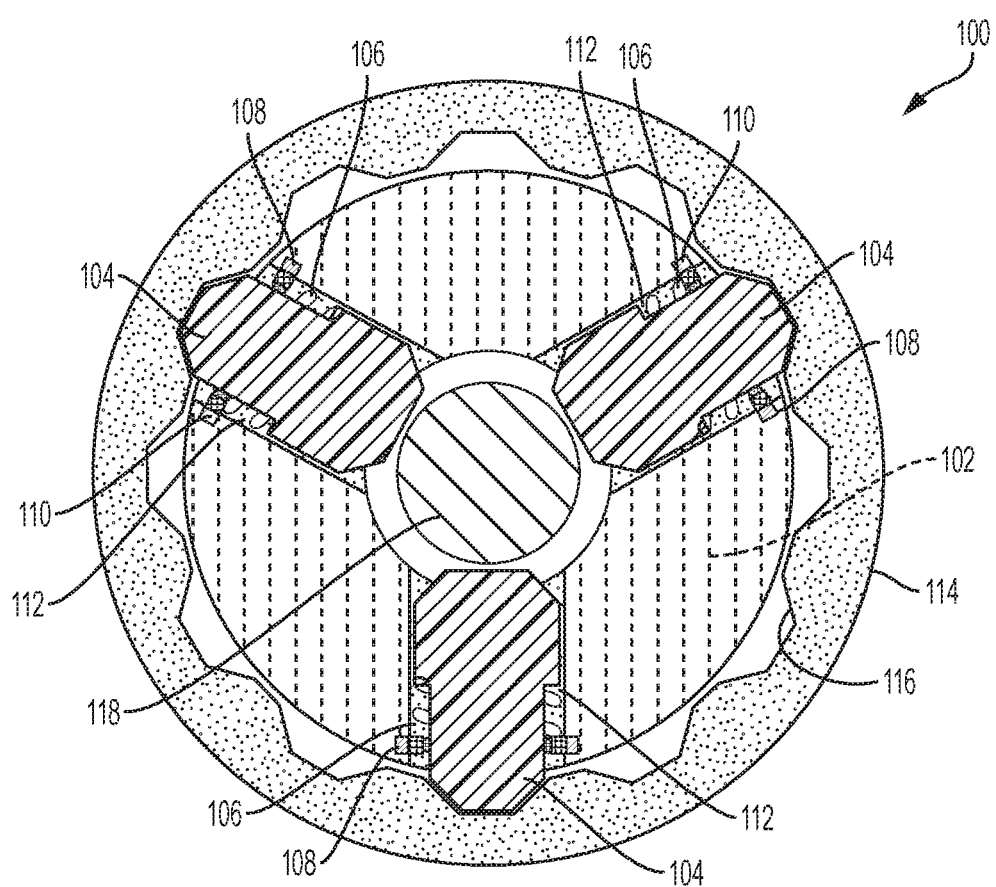
FIG. 1 is a cross-sectional view in an axial direction of an exemplary dog clutch in accordance with the present invention.

FIG. 1 is a cross-sectional view in an axial direction of an exemplary dog clutch 100 in accordance with the present invention. The dog clutch 100 includes a driving member 102 supporting radially movable teeth 104. Each tooth 104 is biased radially inwardly by a biasing member 106. In the particular embodiment illustrated by FIG. 1, the biasing members 106 are helically coiled springs which are captured between spring retainer 108, which are each positioned within a groove 110 in the driving member 102 circumferentially surrounding each corresponding tooth 104, and a landing 112 on each tooth. The dog clutch 100 further includes a driven member 114 with a plurality of radially inwardly facing driven teeth 116 and a selectively actuatable actuator 118.

Figure 2A:
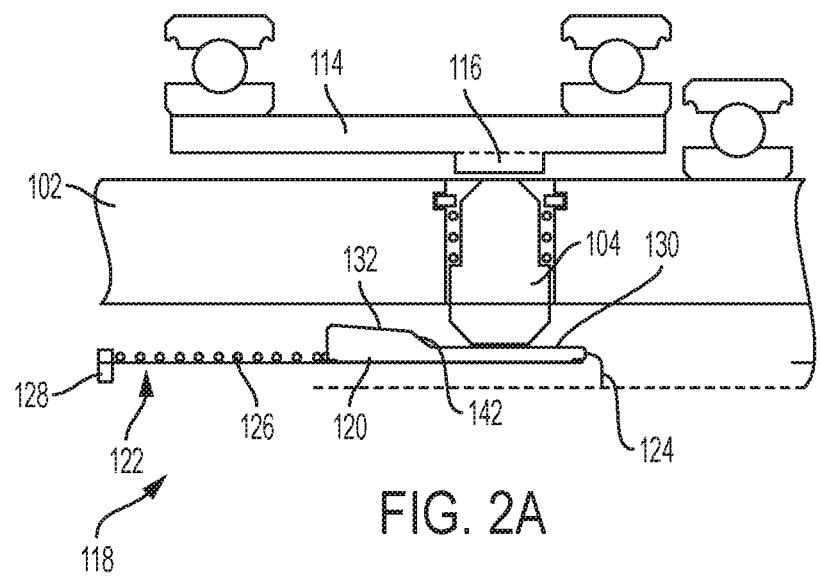
FIG. 2A is a cross-sectional view in a radial direction of a portion of the dog clutch of FIG. 1 in a disengage configuration.
Figure 2B:
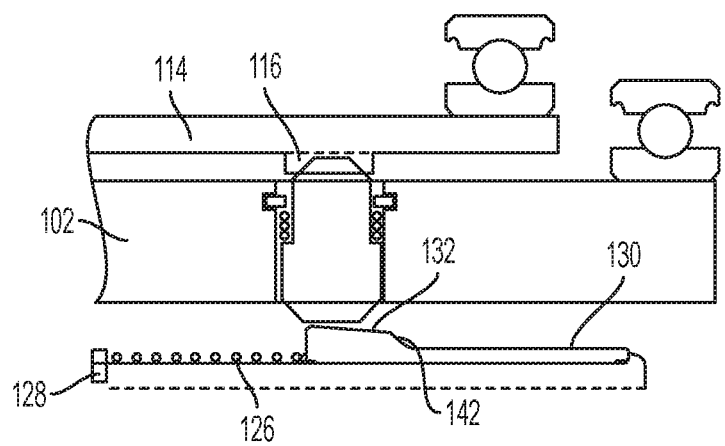
FIG. 2B is a cross-sectional view of a portion of the dog clutch of FIG. 1 in an engage configuration.

Referring now to FIGS. 1 through 2B, operation of the dog clutch 100 and additional detail regarding the actuator 118 is explained. The actuator 118 includes a bullet actuator 120 concentrically mounted on an actuating shaft 122. One end of the actuating shaft 122 includes a swage 124 which prevents the bullet actuator 120 from moving off the end of the actuating shaft 122. A biasing spring 126 is coaxially mounted on the actuating shaft 122 and is captured between the bullet actuator 120 and a retainer 128.

FIG. 2A illustrates a disengaged configuration where the actuating shaft 122 is positioned such that the teeth 104 are biased into contact with a disengagement landing 130 on the bullet actuator 120. In this configuration, the teeth 104 do not engage driven teeth 116 of the driven member 114. Thus, the driving member 102 may rotate freely without engaging the driven member 114.

To transition from the disengaged configuration of FIG. 2A to an engaged configuration of FIG. 2B, the actuating shaft 122 axially moves to the right relative to FIGS. 2A and 2B, which moves the retainer 128 to the right and compresses the biasing spring 126 which causes the bullet actuator 120 to move to the right. As the bullet actuator 120 moves to the right, the teeth 104 slide along the camming surface of the bullet actuator 120 from the disengagement landing 130 to the engagement landing 132. During this transition, a chamfered surface 140 on the teeth 104 may contact a ramp surface 142 on the bullet actuator 120 to facilitate this motion. This causes the teeth 104 to move radially outward against the biasing force of the biasing members 106 and into engagement with driven teeth 116 of the driven member 114. In this manner, the driven member 114 is caused to rotatably move with the rotating motion of the driving member 102.

Additionally, the inventive configuration of the biasing spring 126, bullet actuator 120 and actuating shaft 122 enable the teeth 104 to ratchet when the teeth 104 do not align with the pockets between the teeth 116 on the driven member 114. In the exemplary embodiment illustrated in FIGS. 2A and 2B, the engagement landing 132 is sloped radially inward toward the disengagement landing 130. In this manner, a radially inward applied force from the teeth 104 against the engagement landing 132 which exceeds a predetermined threshold results in the actuator 120 being moved to the left in FIGS. 2A and 2B against the biasing spring 126. This prevents or avoids a situation in which an overload condition might otherwise damage the clutch. When the overload condition is removed or resolved, the biasing spring 126 operates to move the actuator 120 such that the teeth 104 moves from the disengagement landing 130 up the ramp surface 142 to the engagement landing 132.

Further, in a condition where the teeth 104 are not aligned with the driven teeth 116, the inventive configuration permits the bullet actuator 120 to move against the biasing spring 126 and avoids a situation in which the teeth 104 of the driving member 102 are forced into engagement with the teeth 116 of the driven member 114 which might result in failure. The presence of the chamfered surface 140 on the teeth 104 further facilitate this ratcheting function.

To transition from the engaged configuration of FIG. 2B to the disengaged configuration of FIG. 2A, the actuating shaft 122 axially moves to the left (in FIGS. 2A and 2B). The swage 124 pulls the bullet actuator 120 to the left which enables the teeth 104 to slide along the camming surface of the bullet actuator from the engagement landing 132, across the ramp surface 142 to the disengagement landing 130 which permits the biasing members 106 to positively force the teeth 104 out of engaging contact with the driven teeth 116. The biasing members 106 provide a significant advantage over conventional radially applied dog clutch designs because the biasing members 106 overcome the centrifugal force pulling the teeth 104 radially outward and thereby enable positive control over the disengagement of the teeth 104 from the driven teeth 116.

As explained above, the engagement landing 132 includes a slight radially inward slope which provides a fuse function which enables the bullet actuator 120 to slide left on the actuating shaft 122, against the biasing spring 126 to move the teeth 104 from contact with the engagement landing 132 to the disengagement landing 130 when the dog clutch 100 is overloaded. In the absence of an overload condition, the biasing spring 126 biases the bullet actuator 120 against the swage 124 which serves to prevent the teeth 104 from sliding down (camming down) from the engagement landing 132 to the disengagement landing 130.

Figure 3:
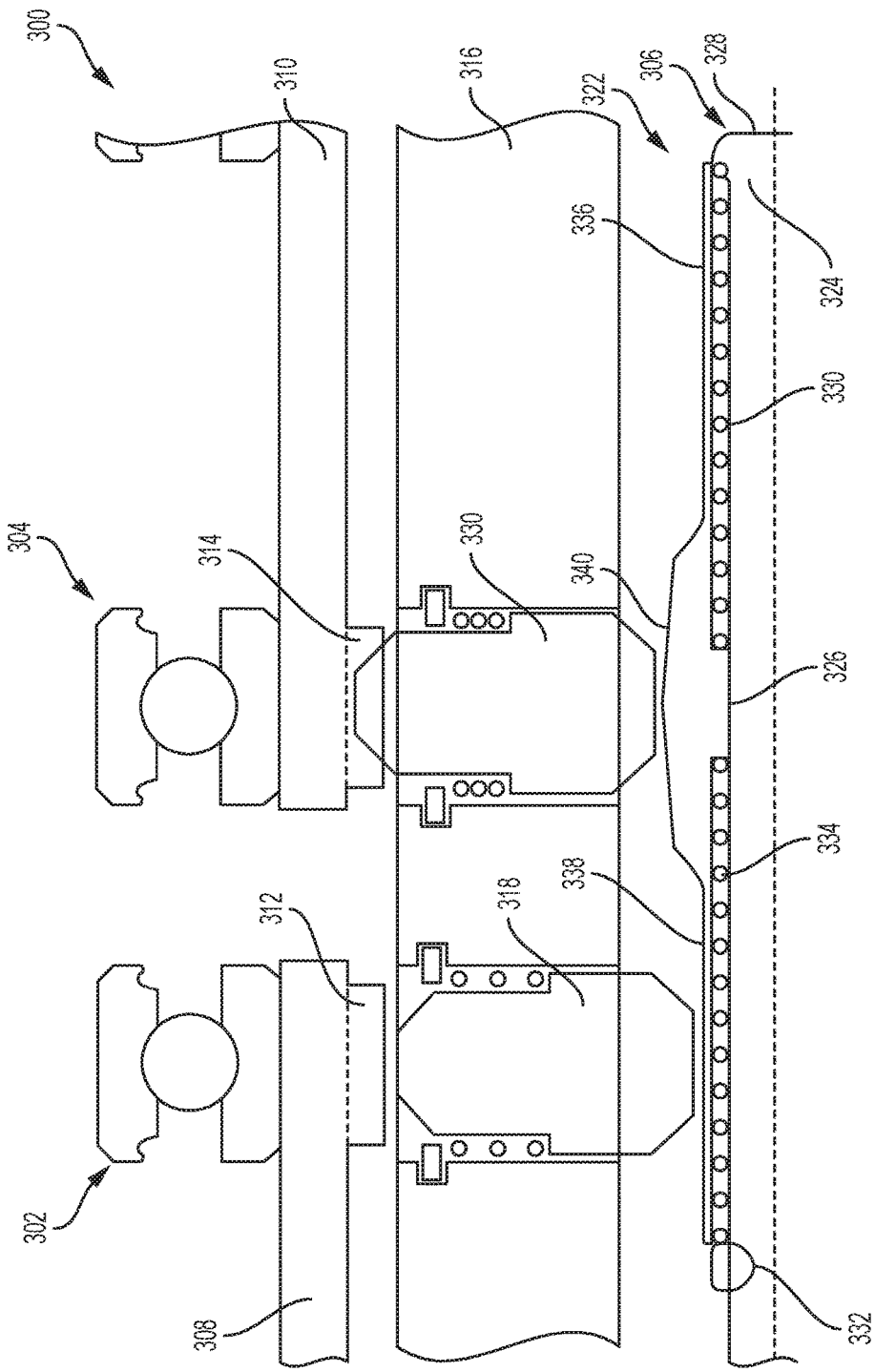
FIG. 3 is a cross-sectional view of a portion of another exemplary dog clutch including multiple dog clutches with a single actuator.

FIG. 3 is a cross-sectional view of a portion of another exemplary dog clutch 300. The dog clutch 300 illustrates an inventive configuration which includes two clutches 302 and 304 actuation of each of which are controlled with a single actuator 306. Each of the clutches 302 and 304 include components which are similar to that previously described with respect to FIGS. 2A and 2B. The dog clutch 300 includes two driven members 308 and 310 that each include driven teeth 312 and 314. The dog clutch 300 includes a driving member 316 with two sets of driving teeth 318 and 320 which selectively engage with driven teeth 312 and 314, respectively.

The actuator 306 of the dog clutch 300 includes a bullet actuator 322 coaxially positioned on actuating shaft 324. The bullet actuator 322 includes a radially inward extending projection 326 and the actuating shaft 324 includes a swaged end 328. A first biasing spring 330 is radially captured between the bullet actuator 322 and the actuator shaft 324 and axially captured between the swaged end 328 and the projection 326. A retainer 332 is mounted on the actuator shaft 324 and a second biasing spring 334 is radially captured between the bullet actuator 322 and the actuator shaft 324 and axially captured between the projection 326 and the retainer 332. The bullet actuator includes a first disengagement landing 336, as second disengagement landing 338, and an engagement landing 340.

Operation of dog clutch 300 is similar to that which was previously described with respect to dog clutch 100 in FIGS. 2A and 2B, and include all of the previously described advantages and benefits over that of conventional dog clutches. The dog clutch 300 differs in operation in that the swaged end 328 of the actuator shaft 324 does not directly engage the bullet actuator 322. Rather, the swaged end 328 engages biasing spring 330 to bias the bullet actuator 322 to the left when the actuator shaft 324 moves to the left (in FIG. 3) as the biasing spring 330 engages and biases the projection 326 to the left. During this engagement, the bullet actuator 322 may extend slightly off the end of the actuator shaft 324 to accommodate the compression of the biasing spring 330.

Figure 4A:
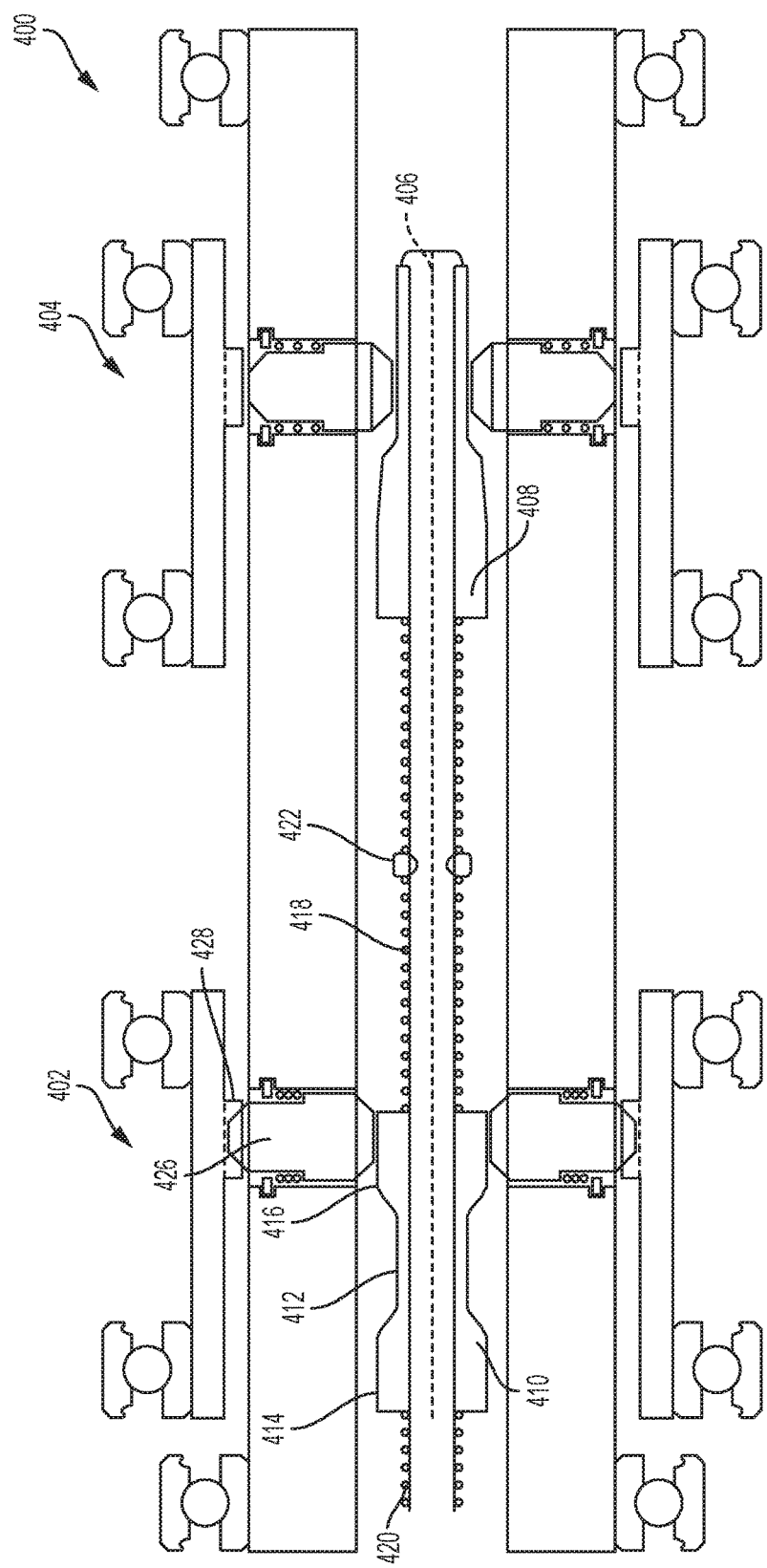
FIG. 4A is a cross-sectional view of a portion of another exemplary dog clutch in a first configuration.
Figure 4B:
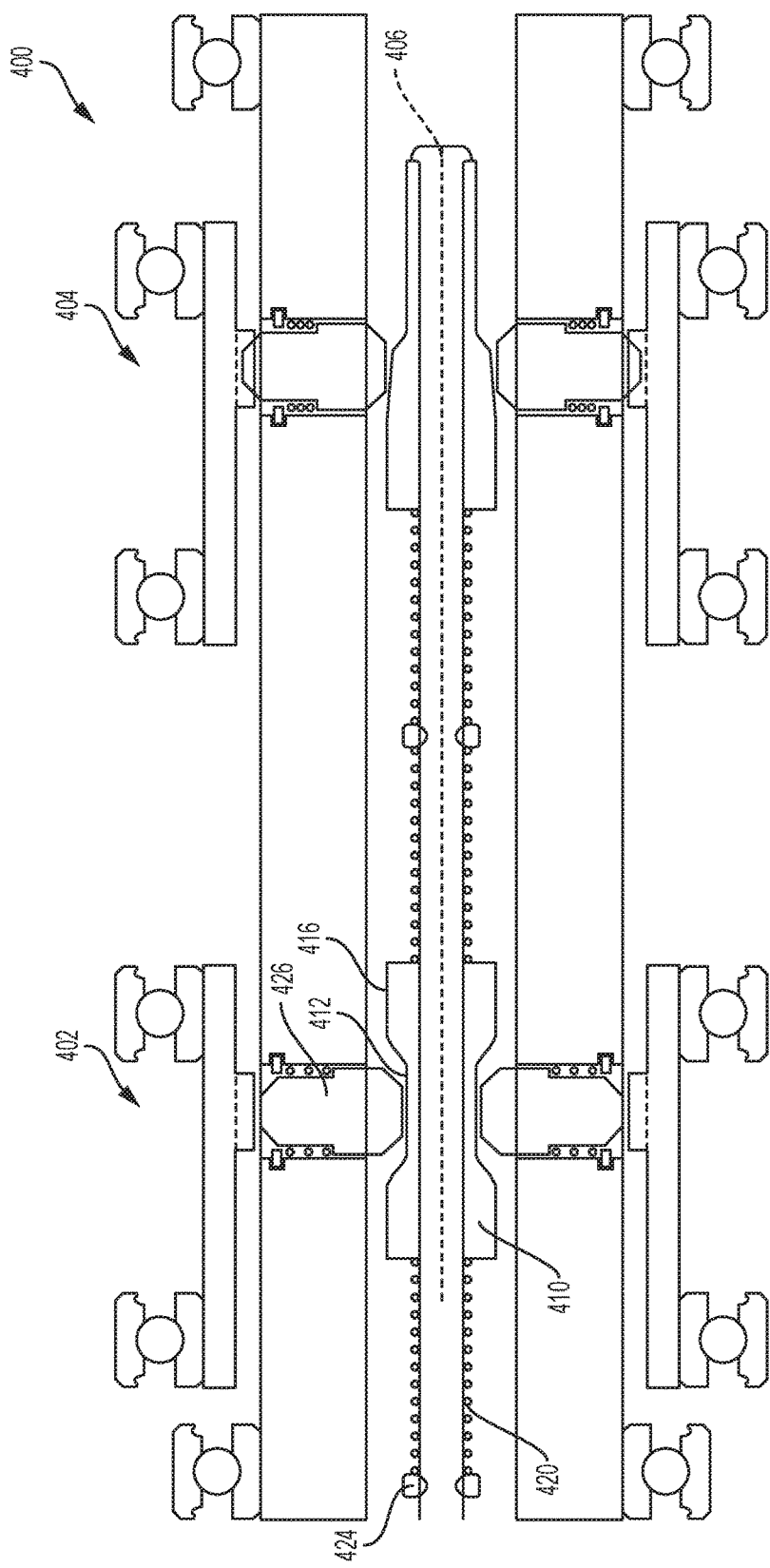
FIG. 4B is a cross-sectional view of a portion of the dog clutch of FIG. 4A in a second configuration.
Figure 4C:
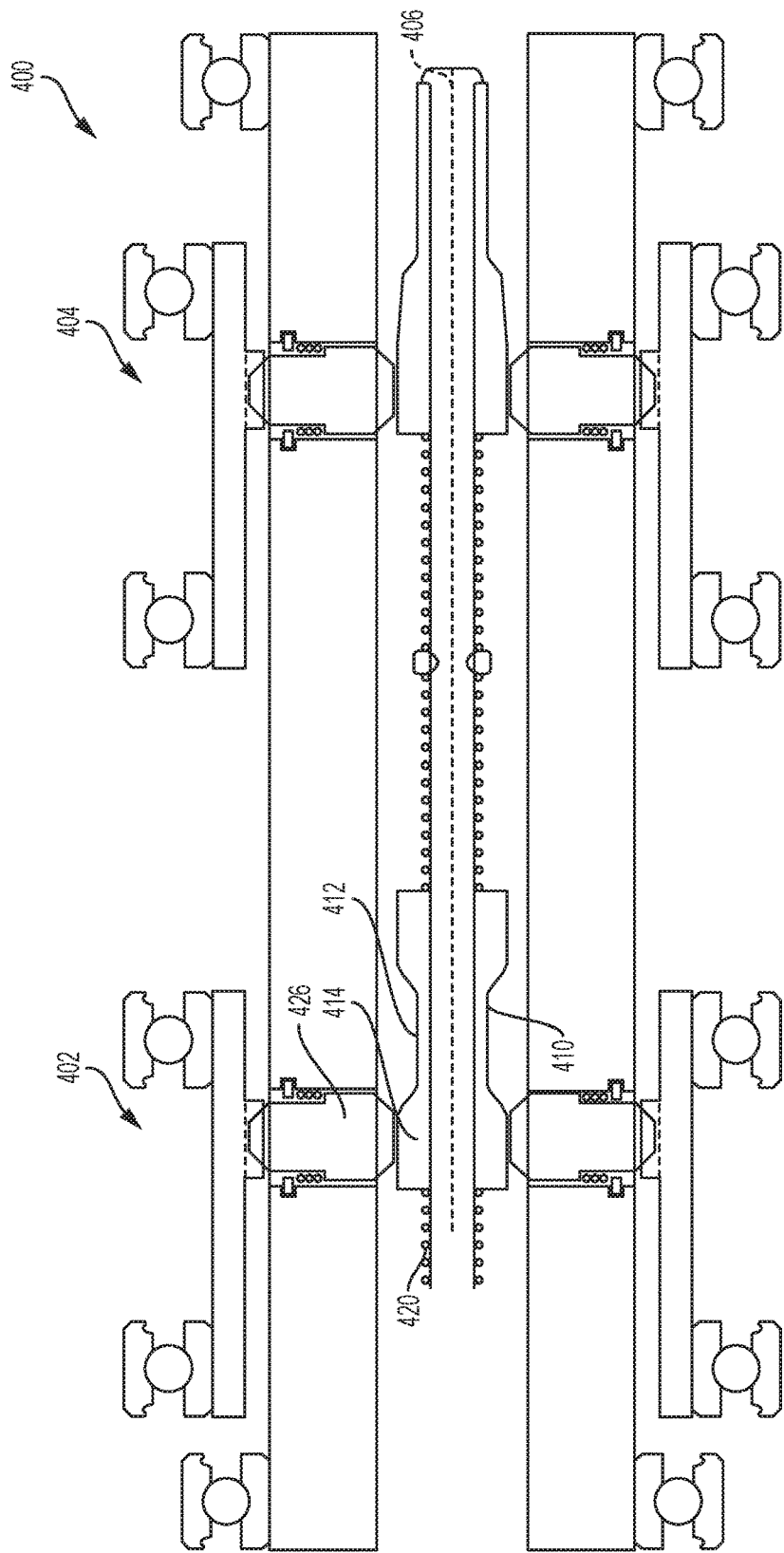
FIG. 4C is a cross-sectional view of a portion of the dog clutch of FIG. 4A in a third configuration.

FIGS. 4A-4C illustrate cross-sectional views of a portion of another exemplary dog clutch 400 in different engagement configurations. The dog clutch 400 includes two independently selectable and engageable clutches 402 and 404. The dog clutch 400 includes a single actuator shaft 406. A first bullet actuator 408 and second bullet actuator 410 are coaxially mounted on the single actuator shaft 406. The first clutch 404 and first bullet actuator 408 operate in a manner very similar to that described above with respect to dog clutch 100 of FIGS. 1-2B. In contrast, the second bullet actuator 410 includes a single disengagement landing 412, and two engagement landings: a first engagement landing 414 and a second engagement landing 416. The second clutch 402 further includes a first biasing member 418, second biasing member 420, first retainer 422 and second retainer 424 (see FIG. 4B). First biasing member 418 and second biasing member 420 are coaxially mounted on the actuator shaft 406. The first biasing member 418 is captured on the shaft 406 between the first retainer 422 and the bullet actuator 410 and the second biasing member 420 is captured on the shaft 406 between the second retainer 424 and the bullet actuator 410.

Both bullet actuators 408 and 410 include the inventive features described previously including a radially inwardly slope from the engagement landings to the respective disengagement landings in combination with biasing members which provide a fuse function that enables each clutch to disengage in the presence of an overload condition. In this manner, each clutch 402 and 404 will disengage if the load applied to the respective clutch exceeds a predetermined threshold.

FIG. 4A illustrates the dog clutch 400 in a configuration where first clutch 404 is disengaged while the second clutch 402 is engaged. This configuration is attained when the actuator shaft 406 is in the left most position relative to that illustrated by FIGS. 4A-4C. In this configuration, the teeth 426 of the second clutch 402 are in contact with second engagement landing 416 such that the teeth 426 engage the driven teeth 428.

FIG. 4B illustrates the dog clutch 400 in a configuration where first clutch 404 is engaged while the second clutch 402 is disengaged. The clutch may transition between the configuration illustrated in FIG. 4A to that of FIG. 4B by axially moving the actuator shaft 406 to the right. Moving the shaft 406 to the right causes the retainer 424 to slightly compress the biasing member 420 which biases the bullet actuator 410 to the right such that the teeth 426 move from contact with the engagement landing 416 to the disengagement landing 412.

FIG. 4C illustrates the dog clutch 400 in a configuration where both clutches 402 and 404 are engaged. The clutch may transition between the configuration illustrated in FIG. 4B to that of FIG. 4C by axially moving the actuator shaft 406 to the right. Moving the shaft 406 to the right causes the retainer 424 to slightly compress the biasing member 420 which biases the bullet actuator 410 to the right such that the teeth 426 move from contact with the disengagement landing 412 to the engagement landing 414.

Transition between the configuration of FIGS. 4C to 4B and between that of FIGS. 4B and 4A may be similarly accomplished by moving the actuator 406 to the left.

While dog clutch 400 illustrated in FIGS. 4A-4C do not illustrate a configuration where both clutches 402 and 404 are disengaged, it is to be understood that such a configuration may be achieved by modifying the axial positions of the engagement and disengagement landings of the bullet actuators to enable such a configuration and still form an exemplary embodiment of the present invention. Further, any number of additional clutches and configurations may be contemplated and remain exemplary embodiments of the present invention. As explained previously, exemplary embodiments of the present invention provide the ability to minimize or prevent potential damage in an overload condition and also to control multiple radially applied dog clutches using a single actuator which can greatly simplify operation, reduce size and cost.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A dog clutch for a vehicle transmission, the clutch comprising:
   a driving member configured to rotate about an axis and including a cavity extending radially from the axis;
   a driving tooth slidably movable within the radially extending cavity;
   a driven member coaxially surrounding the driving member and including a radially inward extending driven tooth axially aligned with the driving tooth;
   an actuator shaft coaxially positioned within the driving member and movable along the axis;
   a retainer on the actuator shaft;
   a bullet actuator coaxially mounted on the actuator shaft; and
   a biasing member coaxially mounted on the actuator shaft and positioned between the bullet actuator and the retainer.

2. The clutch of claim 1, wherein the actuator shaft comprises a swaged end.

3. The clutch of claim 2, wherein the bullet actuator is positioned between the swaged end and the biasing member.

4. The clutch of claim 1, wherein the bullet actuator comprises an engagement landing and a disengagement landing axially adjacent to the engagement landing.

5. The clutch of claim 4, wherein the engagement landing is radially inwardly sloping toward the disengagement landing.

6. The clutch of claim 4, wherein the engagement landing is radially inwardly sloping away from the biasing member.

7. The clutch of claim 4, wherein the biasing member axially biases the bullet actuator on the actuator shaft in an axial direction toward an engagement axial position providing contact between the driving tooth and the engagement landing such that the driving tooth engages the driven tooth and away from a disengagement axial position providing contact between the driving tooth and the disengagement landing such that the driving tooth does not engage the driven tooth.

8. The clutch of claim 4, wherein the bullet actuator further comprises a ramp surface between the engagement landing and the disengagement landing.

9. The clutch of claim 1, wherein the biasing member comprises a helical coil spring coaxially surrounding the actuator shaft.

10. The clutch of claim 1, wherein the actuator shaft comprises a retaining groove and wherein the retainer is positioned within the retaining groove.

11. A dog clutch for a vehicle transmission, the clutch comprising:
    a driving member configured to rotate about an axis and including a first cavity extending radially from the axis and a second cavity extending radially from the axis;
    a first driving tooth slidably movable within the first radially extending cavity;
    a second driving tooth slidably movable within the second radially extending cavity;
    a first driven member coaxially surrounding the driving member and including a first radially inward extending driven tooth axially aligned with the first driving tooth;
    a second driven member coaxially surrounding the driving member and including a second radially inward extending driven tooth axially aligned with the second driving tooth;
    an actuator shaft coaxially positioned within the driving member and including a swaged end and movable along the axis;
    a retainer on the actuator shaft;
    a bullet actuator coaxially mounted on the actuator shaft and including a radially inward extending projection;
    a first biasing member coaxially mounted on the actuator shaft and axially positioned between the radially inward extending projection and the retainer; and
    a second biasing member coaxially mounted on the actuator shaft and axially positioned between the radially inward extending projection and the swaged end.

12. The clutch of claim 11, wherein the bullet actuator further comprises a first disengagement landing, a second disengagement landing and an engagement landing axially positioned between the first disengagement landing and the second disengagement landing.

13. The clutch of claim 12, wherein the engagement landing radially slopes inwardly to the first disengagement landing and the second disengagement landing.

14. The clutch of claim 12, wherein the bullet actuator further comprises a first ramp surface between the first disengagement landing and the engagement landing and a second ramp surface between the second disengagement landing and the engagement landing.

15. The clutch of claim 11, wherein one of the first biasing member and the second biasing member comprises a helical coil spring coaxially surrounding the actuator shaft.

16. A dog clutch for a vehicle transmission, the clutch comprising:
- a driving member configured to rotate about an axis and including a first cavity extending radially from the axis and a second cavity extending radially from the axis;
- a first driving tooth slidably movable within the first radially extending cavity;
- a second driving tooth slidably movable within the second radially extending cavity;
- a first driven member coaxially surrounding the driving member and including a first radially inward extending driven tooth that is axially aligned with the first driving tooth;
- a second driven member coaxially surrounding the driving member and including a second radially inward extending driven tooth that is axially aligned with the second driving tooth;
- an actuator shaft coaxially positioned within the driving member and including a swaged end and movable along the axis;
- a first bullet actuator coaxially mounted on the actuator shaft and positioned adjacent to the swaged end;
- a first biasing member coaxially mounted on the actuator shaft and axially positioned adjacent to the first bullet actuator;
- a first retainer on the actuator shaft axially positioned adjacent to the first biasing member;
- a second biasing member coaxially mounted on the actuator shaft and axially positioned adjacent to the first retainer;
- a second bullet actuator coaxially mounted on the actuator shaft and axially positioned adjacent to the second biasing member;
- a third biasing member coaxially mounted on the actuator shaft and axially positioned adjacent to the second bullet actuator; and
- a second retainer on the actuator shaft and axially positioned adjacent to the third biasing member.

17. The clutch of claim 16, wherein one of the first bullet actuator and the second bullet actuator comprises a first engagement landing, a second engagement landing and a disengagement landing axially positioned between the first disengagement landing and the second disengagement landing.

18. The clutch of claim 17, wherein one of the first engagement landing and the second engagement landing radially slopes inwardly to the disengagement landing.

19. The clutch of claim 17, wherein the one of the first bullet actuator and the second bullet actuator further comprises a first ramp surface between the first engagement landing and the disengagement landing and a second ramp surface between the second engagement landing and the disengagement landing.

20. The clutch of claim 16, wherein one of the first biasing member, second biasing member, and third biasing member comprises a helical coil spring coaxially surrounding the actuator shaft.

* * * * *